US012592187B2

(12) United States Patent
Kim et al.

(10) Patent No.: US 12,592,187 B2
(45) Date of Patent: Mar. 31, 2026

(54) ZONAL ATTENUATION COMPENSATION

(71) Applicant: Google LLC, Mountain View, CA (US)

(72) Inventors: Hyunchul Kim, San Jose, CA (US); Chien-Hui Wen, Cupertino, CA (US); Ken Kok Foo, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/780,154

(22) Filed: Jul. 22, 2024

(65) Prior Publication Data

US 2025/0046241 A1     Feb. 6, 2025

Related U.S. Application Data

(60) Provisional application No. 63/516,739, filed on Jul. 31, 2023.

(51) Int. Cl.
*G09G 3/3208* (2016.01)
*G06T 7/11* (2017.01)
*G06T 7/136* (2017.01)

(52) U.S. Cl.
CPC ............. *G09G 3/3208* (2013.01); *G06T 7/11* (2017.01); *G06T 7/136* (2017.01); *G09G 2320/0686* (2013.01); *G09G 2330/021* (2013.01)

(58) Field of Classification Search
None
See application file for complete search history.

(56) References Cited

U.S. PATENT DOCUMENTS

| | | | |
|---|---|---|---|
| 10,997,914 B1 | 5/2021 | Hwang et al. | |
| 2008/0204438 A1 | 8/2008 | Song et al. | |
| 2013/0135272 A1 | 5/2013 | Park | |
| 2014/0267370 A1 | 9/2014 | Albrecht et al. | |
| 2014/0267448 A1 | 9/2014 | Albrecht et al. | |

(Continued)

FOREIGN PATENT DOCUMENTS

| | | |
|---|---|---|
| CN | 103488364 A | 1/2014 |
| CN | 107211076 | 9/2017 |

(Continued)

OTHER PUBLICATIONS

Bai, et al., "On-Pixel Ratio-Based Adjustment of Local High Brightness Control", Oct. 8, 2024, 13 pages.

(Continued)

*Primary Examiner* — Andre L Matthews
(74) *Attorney, Agent, or Firm* — Colby Nipper PLLC

(57) ABSTRACT

This document describes systems and techniques directed at zonal attenuation compensation. In aspects, a system includes a graphics processing unit configured to provide image data to a display panel. A zonal attenuation module is configured to combine a zonal attenuation mask with the image data to generate masked image data, the masked image data having a reduced brightness for portions of data corresponding to one or more regions on the display panel based on the zonal attenuation mask. An inverse zonal attenuation module is configured to apply an inverse zonal attenuation mask to the masked image data to reduce a brightness for additional portions of data corresponding to one or more additional regions on the display panel effective to offset increased brightness in the one or more additional regions on the display panel.

20 Claims, 13 Drawing Sheets

(56) References Cited

U.S. PATENT DOCUMENTS

| 2015/0348246 | A1 | 12/2015 | Lim et al. | |
| 2018/0137332 | A1 | 5/2018 | Andersen et al. | |
| 2018/0350313 | A1 | 12/2018 | Nambi et al. | |
| 2020/0279519 | A1 | 9/2020 | Orio et al. | |
| 2020/0403186 | A1 | 12/2020 | Choi et al. | |
| 2021/0005158 | A1 | 1/2021 | Huang et al. | |
| 2021/0201849 | A1 | 7/2021 | Choi et al. | |
| 2022/0101531 | A1 | 3/2022 | Zhang et al. | |
| 2022/0277707 | A1* | 9/2022 | Choi | G09G 5/10 |
| 2022/0391086 | A1 | 12/2022 | Westerman | |
| 2023/0222950 | A1 | 7/2023 | Zhang | |
| 2023/0274678 | A1 | 8/2023 | Wen et al. | |
| 2023/0306912 | A1 | 9/2023 | Wen et al. | |
| 2024/0105142 | A1 | 3/2024 | Jeon et al. | |
| 2024/0161548 | A1 | 5/2024 | Kim et al. | |
| 2024/0193985 | A1 | 6/2024 | Sammoura et al. | |
| 2024/0264740 | A1 | 8/2024 | Zou et al. | |
| 2024/0298509 | A1 | 9/2024 | Gong et al. | |
| 2024/0404479 | A1* | 12/2024 | Shehata | G09G 3/3291 |

FOREIGN PATENT DOCUMENTS

| CN | 108447456 | A | 8/2018 |
| CN | 110310596 | A | 10/2019 |
| CN | 112288661 | A | 1/2021 |
| CN | 115035851 | A | 9/2022 |
| CN | 117351895 | A | 1/2024 |
| KR | 102438248 | | 8/2022 |
| TW | 201417076 | A | 5/2014 |
| TW | 202318385 | A | 5/2023 |
| TW | 202404343 | A | 1/2024 |
| WO | 2015188595 | A1 | 12/2015 |
| WO | 2020192051 | A1 | 10/2020 |

OTHER PUBLICATIONS

Eltoft, et al., "Adaptive Maximum Fingerprint Touch-Size Threshold for Reduced Unintended Authentication Attempts and Reduced Spoof Accept Rate", Technical Disclosure Commons, https://www.tdcommons.org/dpubs_series/7586, Nov. 22, 2024, 12 pages.

Mienko, et al., ""Ultra-dark" OLED Panel Combining Polarization and Masking Layers", Technical Disclosure Commons, https://www.tdcommons.org/dpubs_series/7923, Mar. 18, 2025, 12 pages.

Hsu, Tai-Yuan, "Histogram-Based Local Tone Mapping Algorithm for a Data Processing Unit", Technical Disclosure Commons, https://www.tdcommons.org/dpubs_series/6151, Aug. 18, 2023, 9 pages.

Lee, et al., "Illumination-Level Adaptive Color Reproduction Method with Lightness Adaptation and Flare Compensation for Mobile Display", Jan. 2007, 9 pages.

Li, et al., "Advanced Metrology for Display Uniformity Performance Judgement", Technical Disclosure Commons, https://www.tdcommons.org/dpubs_series/7119, Jun. 21, 2024, 10 pages.

Li, et al., "Advanced Prediction Model for Variable Refresh Rate Compensation Compensation", May 29, 2024, 9 pages.

Li, et al., "Smart Mathematical Model for Variable Refresh Rate Prediction Algorithm", Technical Disclosure Commons, https://www.tdcommons.org/dpubs_series/7047, May 29, 2024, 10 pages.

Ou, Yafei, "Real-time Tone Mapping: A Survey and Cross-Implementation Hardware Benchmark", May 22, 2022, 21 pages.

Thai, et al., "HDR Image Tone Mapping Histogram Adjustment with Using An Optimized Contrast Parameter", Jan. 5, 2020, 7 pages.

Zhao, et al., "Learning Tone Curves for Local Image Enhancement", May 30, 2022, 15 pagss.

"Foreign Office Action", TW Application No. 113128066, Oct. 28, 2025, 7 pages.

* cited by examiner

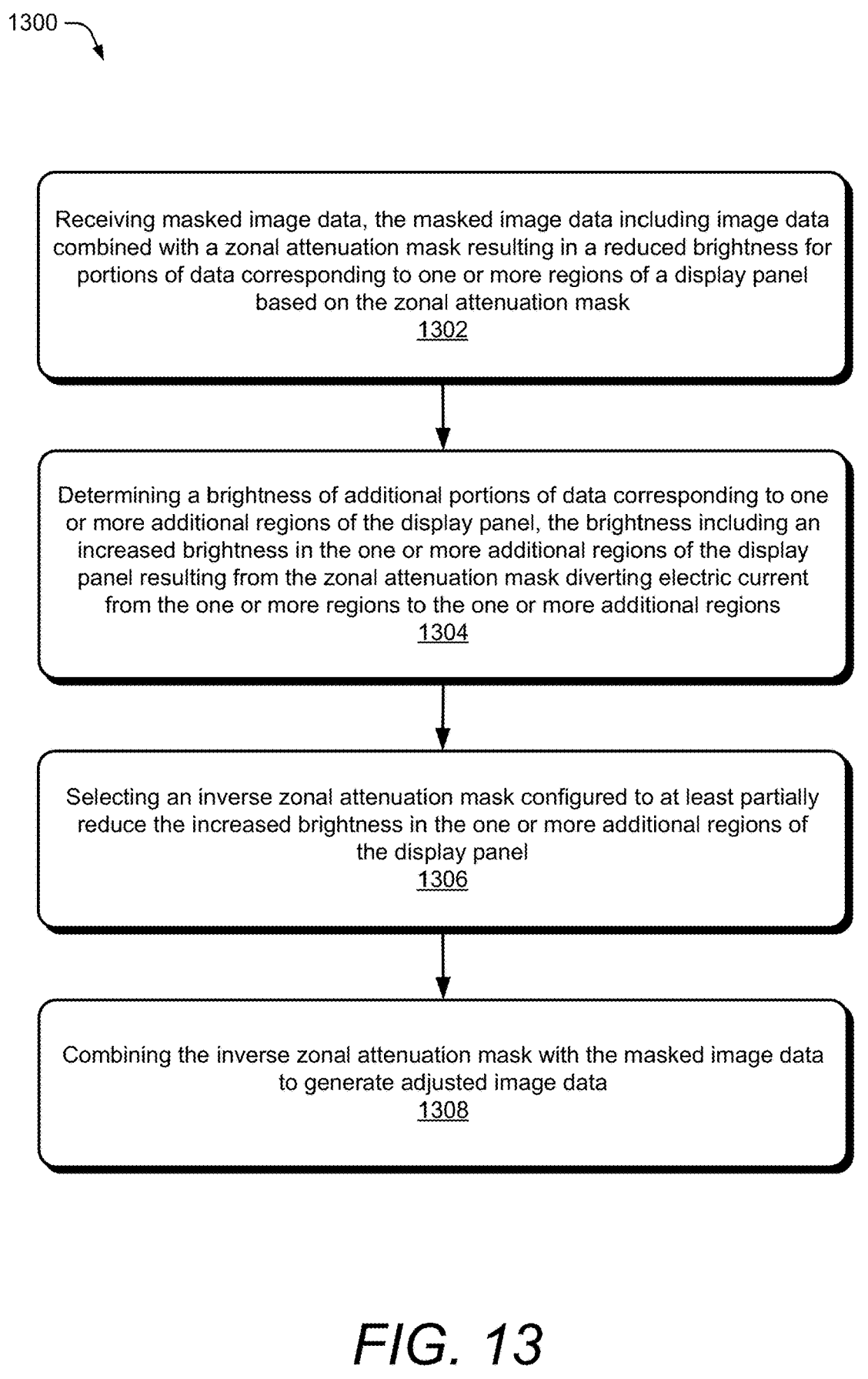

1300 ⌐

Receiving masked image data, the masked image data including image data combined with a zonal attenuation mask resulting in a reduced brightness for portions of data corresponding to one or more regions of a display panel based on the zonal attenuation mask
1302

Determining a brightness of additional portions of data corresponding to one or more additional regions of the display panel, the brightness including an increased brightness in the one or more additional regions of the display panel resulting from the zonal attenuation mask diverting electric current from the one or more regions to the one or more additional regions
1304

Selecting an inverse zonal attenuation mask configured to at least partially reduce the increased brightness in the one or more additional regions of the display panel
1306

Combining the inverse zonal attenuation mask with the masked image data to generate adjusted image data
1308

*FIG. 13*

ZONAL ATTENUATION COMPENSATION

CROSS-REFERENCE TO RELATED APPLICATION(S)

This application claims the benefit of U.S. Provisional Patent Application Ser. No. 63/516,739, filed on Jul. 31, 2023, the disclosure of which is incorporated by reference herein in its entirety.

BACKGROUND

Users frequently interact with display screens of their mobile computing devices to engage with applications, including messaging applications, social media applications, gaming applications, and the like. Backlit display screens expend a significant amount of electric power. In fact, backlit-display screens are often the largest power-consuming component of any system in a mobile telephone. Although energy capacities of batteries have increased over the years, a battery capacity is still a limited resource in mobile devices. Accordingly, reducing the amount of power consumed by a backlit-display screen may benefit users who rely on such devices.

SUMMARY

This document describes systems and techniques directed at zonal attenuation compensation. In aspects, a system includes a graphics processing unit configured to provide image data to a display panel. A zonal attenuation module is configured to combine a zonal attenuation mask with the image data to generate masked image data, the masked image data having a reduced brightness for portions of data corresponding to one or more regions on the display panel based on the zonal attenuation mask. An inverse zonal attenuation module is configured to apply an inverse zonal attenuation mask to the masked image data to reduce a brightness for additional portions of data corresponding to one or more additional regions on the display panel effective to offset increased brightness in the one or more additional regions on the display panel resulting from the zonal attenuation mask diverting electric current from the one or more regions to the one or more additional regions.

As an example, a system includes a general computing subsystem, a display panel, and a display panel subsystem. The display panel subsystem includes a graphics processing unit configured to provide image data to a display panel. A zonal attenuation module is configured to combine a zonal attenuation mask with the image data to generate masked image data, the masked image data having a reduced brightness for portions of data corresponding to one or more regions on the display panel based on the zonal attenuation mask. An inverse zonal attenuation module is configured to apply an inverse zonal attenuation mask to the masked image data to reduce a brightness for additional portions of data corresponding to one or more additional regions on the display panel effective to offset increased brightness in the one or more additional regions on the display panel resulting from the zonal attenuation mask diverting electric current from the one or more regions to the one or more additional regions.

As another example, a method includes receiving masked image data, the masked image data including image data combined with a zonal attenuation mask resulting in a reduced brightness for portions of data corresponding to one or more regions of a display panel based on the zonal attenuation mask. A brightness is determined for additional portions of data corresponding to one or more additional regions of the display panel, the brightness including an increased brightness in the one or more additional regions of the display panel resulting from the zonal attenuation mask diverting electric current from the one or more regions to the one or more additional regions data. An inverse zonal attenuation mask is selected, the inverse zonal attenuation mask configured to at least partially reduce the increased brightness in the one or more additional regions of the display panel. The inverse zonal attenuation mask is combined with the masked image data to generate adjusted image data.

This Summary is provided to introduce systems and techniques directed at zonal attenuation compensation, as further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of systems and techniques directed at zonal attenuation compensation are described in this document with reference to the following drawings. The same numbers are used throughout the drawings to reference like features and components:

FIG. 13 is a flow diagram of an example method of a process to perform inverse zonal attenuation.

DETAILED DESCRIPTION

Overview

A zonal attenuation may be used in some electronic devices to reduce an energy expenditure by a backlit-display screen. Zonal attenuation may be applied, for example, when a mobile telephone is used outdoors (or in other such high ambient-lighting conditions) and a screen brightness is automatically increased (or manually increased by a user) to make the screen more readily viewable. Because users are often most interested in content presented within a central region of the display, zonal attenuation may be used to reduce or attenuate a brightness in areas outside of the central region and, thus, reduce power expenditure. For example, zonal attenuation may be used to reduce or attenuate a brightness at opposing top and bottom end regions of a display, which may not impair a user's ability to view content on the display that is of the most interest.

Although zonal attenuation may preserve battery power by reducing the amount of energy expended to illuminate the end regions of the display, some displays may diminish or counteract potential power savings. For instance, some display technologies do not respond proportionally (e.g., linearly) to the reduced application of power at the opposing end regions of the display panel. As an example, in an organic light-emitting diode (OLED) display panel, individual diodes may illuminate each pixel. When a brightness at opposing end regions of the OLED display panel is reduced, some of the electric current from these dimmed areas may be redirected to the central region of the display. This diversion of electrical current to the central region increases the battery power used to illuminate it. Thus, while less power is expended by zonal attenuation, some power is then wasted by excessively illuminating the central region of the OLED display panel.

To prevent this waste of power caused by excessively illuminating the central region of the display panel, this document describes systems and techniques directed at zonal attenuation compensation. Implementations described herein employ inverse zonal attenuation to reduce a brightness in the central region of the display panel to offset the additional brightness that may result from the redirection of current to the central region of the display panel as a result of zonal attenuation. Reducing brightness that may occur in the central region of the display as a result of using zonal attenuation may recapture some of the desired power savings that zonal attenuation is intended to achieve. Combining the inverse zonal attenuation mask with the data resulting from the application of zonal attenuation may thus preserve battery power.

Overview of Inverse Zonal Attenuation

Figure 1:
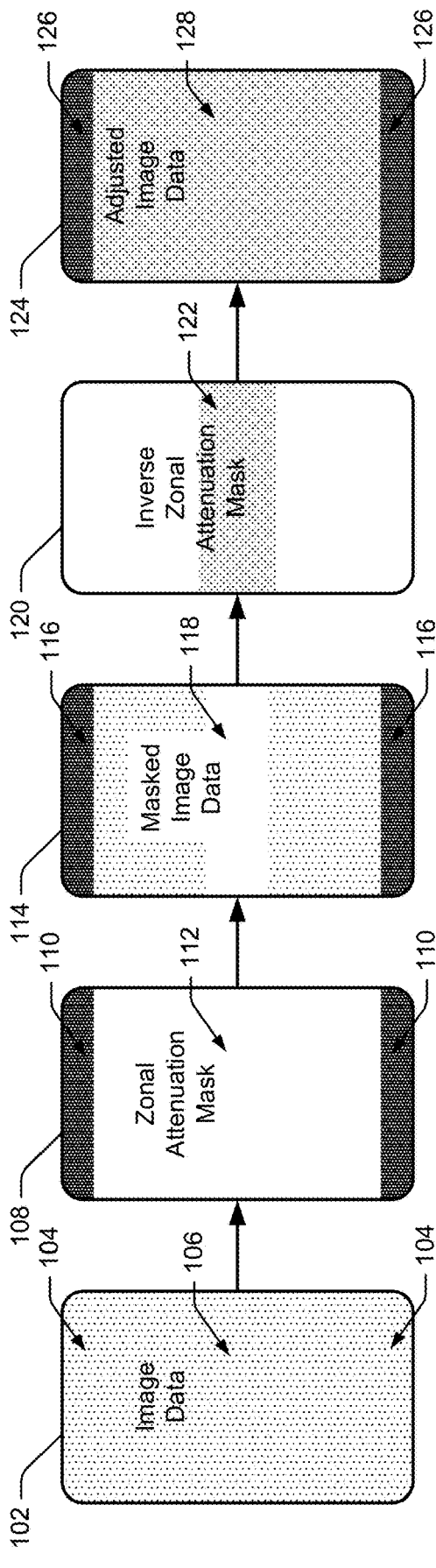
FIG. 1 is a schematic diagram of steps in generating adjusted image data for display including the application of a zonal attenuation mask.

FIG. 1 is a schematic diagram of an implementation of inverse zonal attenuation in accordance with one or more implementations. FIG. 1 illustrates an example implementation 100 of image data 102 being generated, enhanced, and/or manipulated as part of an inverse zonal attenuation process. The image data 102 may be generated by a graphics processing unit (or similar device) and contain information usable to present content on displays, including images or video. Although the image data 102 is illustrated in FIG. 1 as a two-dimensional block approximating a display, it will be understood by one skilled in the art that this is for illustrative purposes only.

To save power, it may be desirable to reduce a brightness of presented content at one or more regions (e.g., at opposing end regions 104 of a display approximated by the illustrative two-dimensional block of image data 102) that tend to be in a periphery of a user's attention. For example, a central region 106 of a display tends to be a primary area where a user focuses. Thus, roughly analogous to how individuals will not mind the lights being turned off in a room they are not occupying, reducing the brightness at the opposing end regions 104 of a display where the user's attention is not directed may not detract from the user's engagement with the presented content.

Reducing a brightness of the opposing end regions 104 of the display may be accomplished by applying a zonal attenuation mask 108. The zonal attenuation mask 108 may be combined with the image data 102 to reduce a brightness of select portions of the image data 102. In the example of FIG. 1, the zonal attenuation mask 108 includes opposing end regions having a reduced brightness 110 that, when combined with the image data 102, will serve to reduce the brightness of the opposing end regions 104 in a resulting combination of the image data 102 with the zonal attenuation mask 108. In at least some implementations, the zonal attenuation mask 108 is directed at only altering a brightness of the opposing end regions 104 of the image data 102. Thus, a central region 112 of the zonal attenuation mask 108 may not include a masking to dim the central region 106 of the image data 102.

Masked image data 114, which represents the combination of the image data 102 with the zonal attenuation mask 108, includes end regions 116 having reduced brightness 110 as intended. The reduced brightness of the end regions 116 in the masked image data 114 saves some electric power that otherwise may have been expended to more-brightly illuminate the end regions 116. However, as a result of nonlinear loading that may occur in an OLED display panel, for example, some electric current (and therefore power) may be redirected to a central region 118 of the masked image data 114. As a result, the central region 118 of the masked image data 114 may have a greater brightness than the central region 106 of the image data 102 (e.g., greater brightness than originally intended). Consequently, some of the electric power intended to be saved in reducing brightness of the end regions 116 through the use of the zonal attenuation mask 108 is expended in the central region 118 of the masked image data 114.

In aspects, to compensate for additional power expenditure, an inverse zonal attenuation mask 120 may be applied to the masked image data 114. The inverse zonal attenuation mask 120 may be a partial inverse of the zonal attenuation mask 108. While the zonal attenuation mask 108 includes end regions of reduced brightness 110, the inverse zonal attenuation mask 120 may include a central region of reduced brightness 122 to offset the excessive illumination that may be directed to the central region 118. Combining the masked image data 114 with the inverse zonal attenuation mask 120 may result in adjusted image data 124. The adjusted image data 124 may include end regions of reduced brightness 126 and a restored-brightness central region 128. For example, the central region 128 of the adjusted image data 124 may have approximately the same brightness as the central region 106 of the image data 102. Thus, the adjusted image data 124 reduces a power expenditure by (i) presenting content with end regions of reduced brightness 126 and (ii) reducing an excessive brightness in the central region 128.

Thus, the inverse zonal attenuation mask 120 may recapture some of the electric power that was supposed to be saved through the application of the zonal attenuation mask 108 but that was unintentionally and/or undesirably directed to the central region 118 of the masked image data 114.

Generation and Application of Inverse Zonal Attenuation Masks

Figure 2:
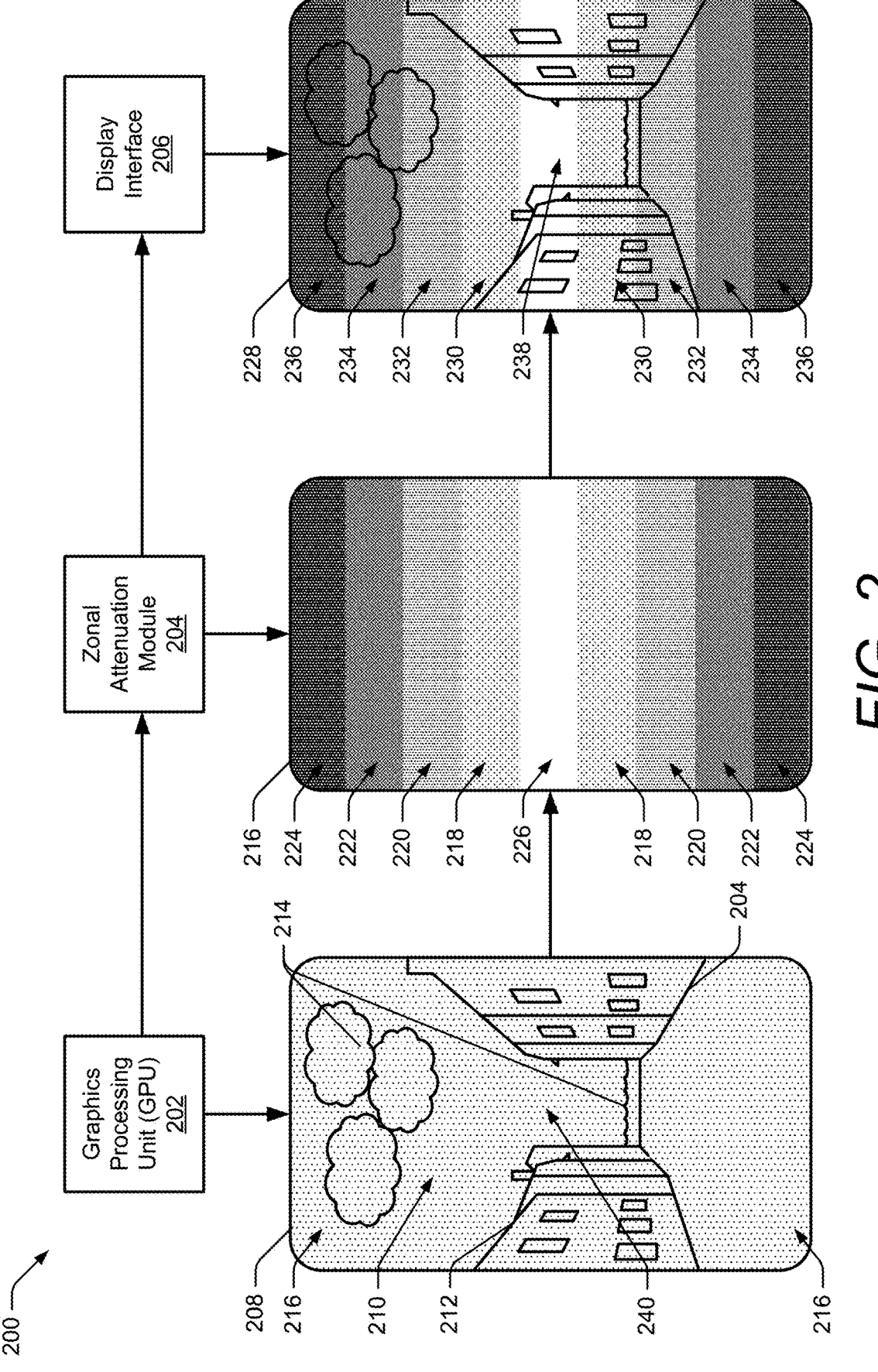
FIG. 2 is schematic diagram of a display subsystem using zonal attenuation to generate masked image data.

FIG. 2 illustrates a display subsystem 200 having a graphics processing unit (GPU) 202, a zonal attenuation module 204, and a display interface 206 that may operate, together, to present viewable content. As illustrated, the GPU 202 generates image data 208. The image data 208, in this example, includes an image 210 (e.g., a potential image) having structures 212 and nature features 214. The image data 208 may be unmanipulated by one or more masks, with each of the structures 212 and features 214 in the image 210 being presentable at a brightness level as the image data 208 was generated and/or captured for presentation on a display panel (not expressly shown in FIG. 2).

The image data 208 is provided by the GPU 202 to the zonal attenuation module 204 that generates or retrieves a zonal attenuation mask 216. Based on a brightness, a gray level, and/or other properties of the image data 208, the zonal attenuation module 204 generates or selects the zonal attenuation mask 216 to be combined with the image data 208. As illustrated, the zonal attenuation mask 216 includes one or more regions of reduced brightness 218, 220, 222, and 224 that represent a gradient of increasingly reduced brightness at greater distances from a central region 226 of the zonal attenuation mask 216. Although for purposes of the black and white line drawing of FIG. 2 the one or more regions of reduced brightness 218, 220, 222, and 224 are presented as discretely-changing regions of reduced brightness, it will be appreciated that the function of one or more regions of reduced brightness 218, 220, 222, and 224 may be replaced by a continuous gradient region in which the brightness is gradually reduced at increasing distances from the central region 226 of the zonal attenuation mask 216.

As described with reference to FIG. 1, combining the zonal attenuation mask 216 with the image data 208 results in a generation of masked image data 228. Based on the zonal attenuation mask 216 combined with the image data 208, the masked image data 228 has a reduced brightness for portions of data corresponding to one or more regions on the display panel. In the example of FIG. 2, the resulting regions of reduced brightness 230, 232, 234, and 236 may include graduated areas of increasingly reduced brightness at greater distances from a central region 238 of the masked image data 228. The masked image data 228 may be provided by the display interface 206 to a display panel (not shown in FIG. 2). A user viewing the content of the masked image data 228 may not be troubled by the areas of reduced brightness 230, 232, 234, and 236 surrounding the central region 230.

Combining the zonal attenuation mask 216 with the image data 208 may save some electric power used in illuminating the masked image data 228 as compared to illuminating the image data 208 with end regions with the same brightness as the rest of the image data 208. However, the reduced brightness in one or more of the areas of reduced brightness 230, 232, 234, and 236 may not save all of the electric current that would be used to display the image data 208. Instead, some of that electric current saved by the areas of reduced brightness 230, 232, 234, and 236 is diverted toward the central region 238 of the masked image data 228. Comparing the masked image data 228 with the image data 208, it can be seen that the central region 238 of the masked image data 228 actually has a greater brightness than a central region 240 of the image data 208. Presenting the central region 238 of the masked image data 228 at a greater brightness may consume some electric power that was saved in using the zonal attenuation mask 216 to produce the regions of reduced brightness 230, 232, 234, and 236. In aspects, use of an inverse zonal attenuation mask as described with reference to FIG. 1 may reduce a brightness of the central region 238 of the masked image data 228 from a level of greater brightness toward a level of brightness originally intended in the central region 240 of the image data 208.

Figure 3:
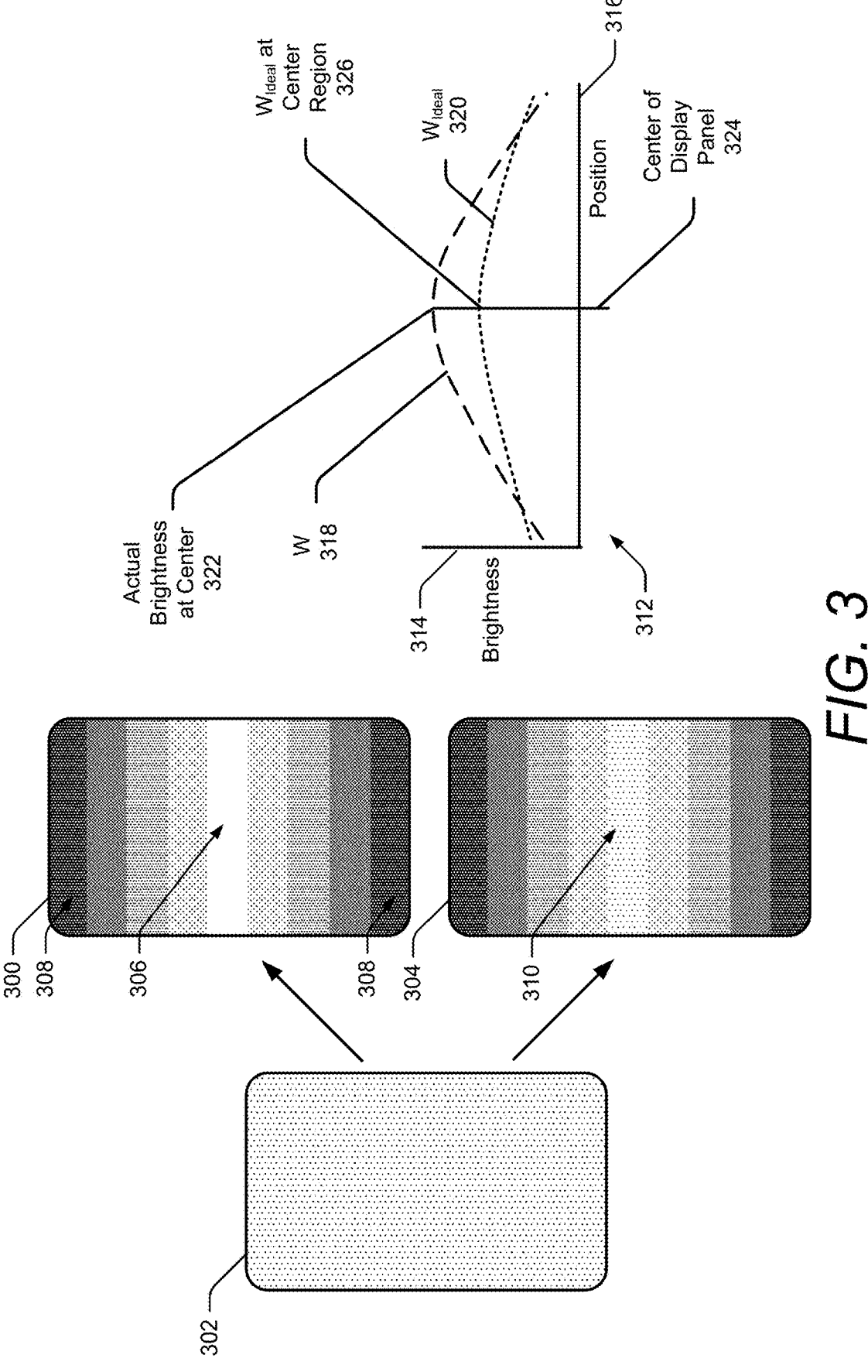
FIGS. 3 and 4 are schematic diagrams of a process of comparing brightness of actual image data with brightness of ideal image data to generate an inverse zonal attenuation mask.

Referring to FIG. 3, in aspects, an inverse zonal attenuation mask may be generated from a comparative analysis of actual masked image data 300, resulting from a zonal attenuation mask (not illustrated) applied to a blank image 302, and ideal masked image data 304. The ideal masked image data 304 may represent the brightness of what the blank image 302 should be after application of the zonal attenuation mask if the brightness were not affected by nonlinear panel loading considerations. Thus, while the central region 306 of the actual masked data 300 has a greater brightness than the original blank image 302, the central region 238 of the ideal masked image data 304 has approximately the same brightness as the original, blank image 302. It is an object of inverse zonal attenuation to generate adjusted image data in which the central region of the adjusted image data has the same brightness as the image data, free from excessive illumination.

A graph 312 plots brightness 314 relative to position 316 on the display panel. Comparing a plot of the brightness of the actual masked image data W 318 (represented in the graph 312 in dashed lines) with a plot of the brightness of the ideal masked image data $W_{Ideal}$ 320 (represented in the graph 312 in dotted lines) illustrates that W 318 has a greater brightness at a center region 322 (e.g., corresponding to a center of the display panel 324) than a brightness at a center region 326 for $W_{Ideal}$ 320.

In aspects, an inverse zonal attenuation mask is derivable by comparing the brightness W 318 of the actual masked image data 300 and the brightness $W_{Ideal}$ 320 of the ideal masked image data 304. A ratio of W 318 to $W_{Ideal}$ 320, $W/W_{Ideal}$, at each position along the display panel represents a relative brightness of the actual masked image data 300 to the brightness of the ideal masked image data 304. Thus, an inverse of that ratio, $W_{Ideal}/W$, yields, at one or more positions, an offset value to reduce brightness of the actual masked image data 300 to that of the ideal masked image data 304. In this way, the term inverse may refer to a state or process of brightness offsetting to approximately achieve a brightness value for one or more regions of a display as intended (e.g., programmed) by the ideal masked image data.

Figure 4:
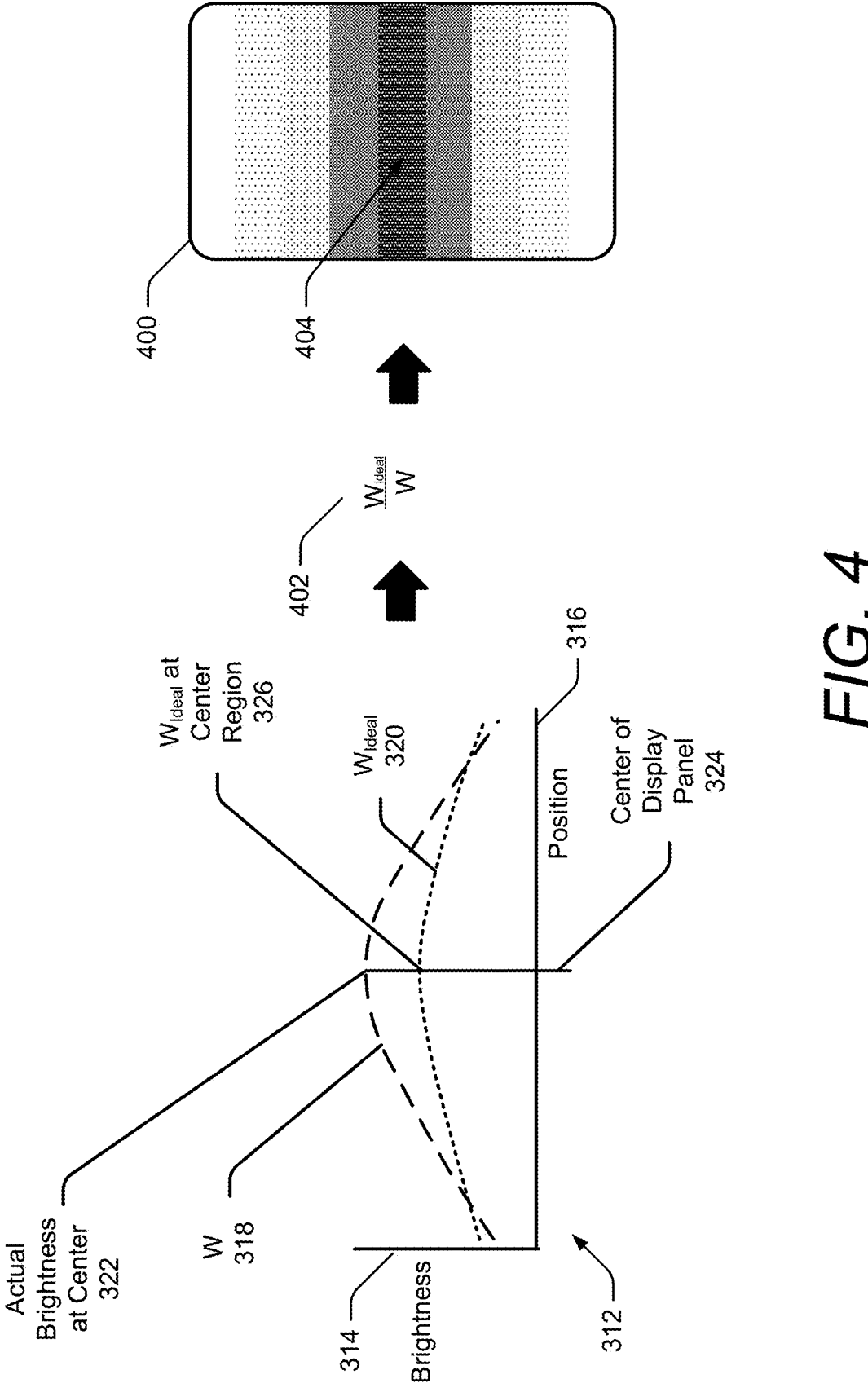

Referring to FIG. 4, an inverse zonal attenuation mask 400 is generated according to the ratio of $W_{Ideal}/W$ 402 at each position (e.g., along a display panel) to offset the increased brightness of the actual masked image data 300 (FIG. 3). The inverse zonal attenuation mask 400 includes one or more central regions having reduced brightness 404 to offset the increased brightness at the central region 238 of the actual masked image data 300. Again, while the black and white drawing of FIG. 4 depicts the one or more central regions as having discreet shifts in brightness therebetween, it will be appreciated that the one or more central regions having reduced brightness 404 may be manifested as a single, continuous gradient of changing brightness.

Figure 5:
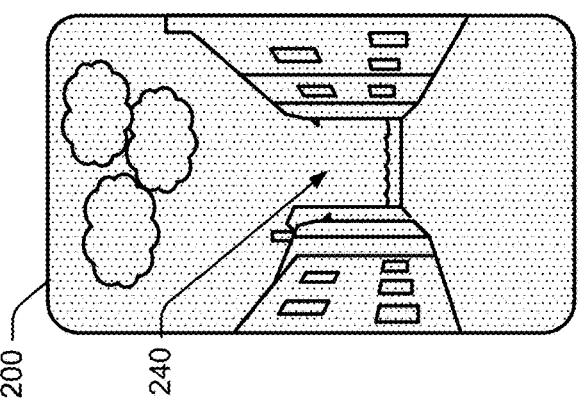
FIG. 5 is schematic diagram of a display subsystem including an inverse zonal attenuation module to apply an inverse zonal attenuation mask.

Referring to FIG. 5, a display subsystem 500 includes an inverse zonal attenuation module 502 configured to apply an inverse zonal attenuation mask 400 to the masked image data 228 to reduce a brightness for additional portions of data corresponding to one or more additional regions on the display panel. The inverse zonal attenuation mask 400 is thus effective to offset increased brightness in the one or more additional regions on the display panel resulting from the zonal attenuation mask 216 (see FIG. 2) diverting electric current from the one or more regions to the one or more additional regions. The inverse zonal attenuation module 502 thus combines the inverse zonal attenuation mask 400 (FIG. 4) with the masked image data 228 (FIG. 2) to yield adjusted image data 504. In the adjusted image data 504, the one or more additional regions having a reduced brightness as a result of being combined with the inverse zonal attenuation mask 400, such as a central region 506, have a similar (e.g., identical) brightness as a central region 240 of the image data 208 (FIG. 2). As illustrated, the central region 506 of the adjusted image data 504 is less bright than the central region 238 of the masked image data 228 after the zonal attenuation mask 216 was applied to the image data 208, as described with reference to FIG. 2. The inverse zonal attenuation module 502 thus may offset increased brightness in the one or more additional regions (e.g., the central region 238 of the masked image data 228) on the display panel. The increased brightness 238 of the masked data 228 may result from the zonal attenuation mask 216 causing electric current to be diverted from the one or more regions, such as the regions 230, 232, 234, and 236, to the one or more additional regions including the central region 238. The adjusted image data 504 is provided to the display interface 206 for presentation via a display panel 508.

Generating output at the display panel 508 with reduced brightness of the central region 506 in the adjusted image data 504 saves some of the power that may have been unintentionally expended increasing the brightness of the central region 238 of the masked data 228. The inverse zonal attenuation mask 400 thus offsets the diversion of electrical current to the central region 238 of the masked image data 228 (e.g., that may be a consequence of loading constraints in the display panel 508 caused by the application of the regions of reduced brightness 230, 232, 234, and 236 diverting electric current to the central region 238 of the masked image data 228 as described with reference to FIG. 2).

The diversion of electric current and the resulting excessive brightness in a central region of a display panel may depend on the loading characteristics of the display panel. Thus, inverse zonal attenuation masks for use with a particular display panel configuration may be appropriately created from data captured from a display panel of the same display panel configuration. To generate inverse zonal attenuation masks to adjust for different levels of display brightness, masked image data may be generated from a display panel or display panels generating blank images at varying brightnesses to which zonal attenuation masks are applied.

Figure 6:
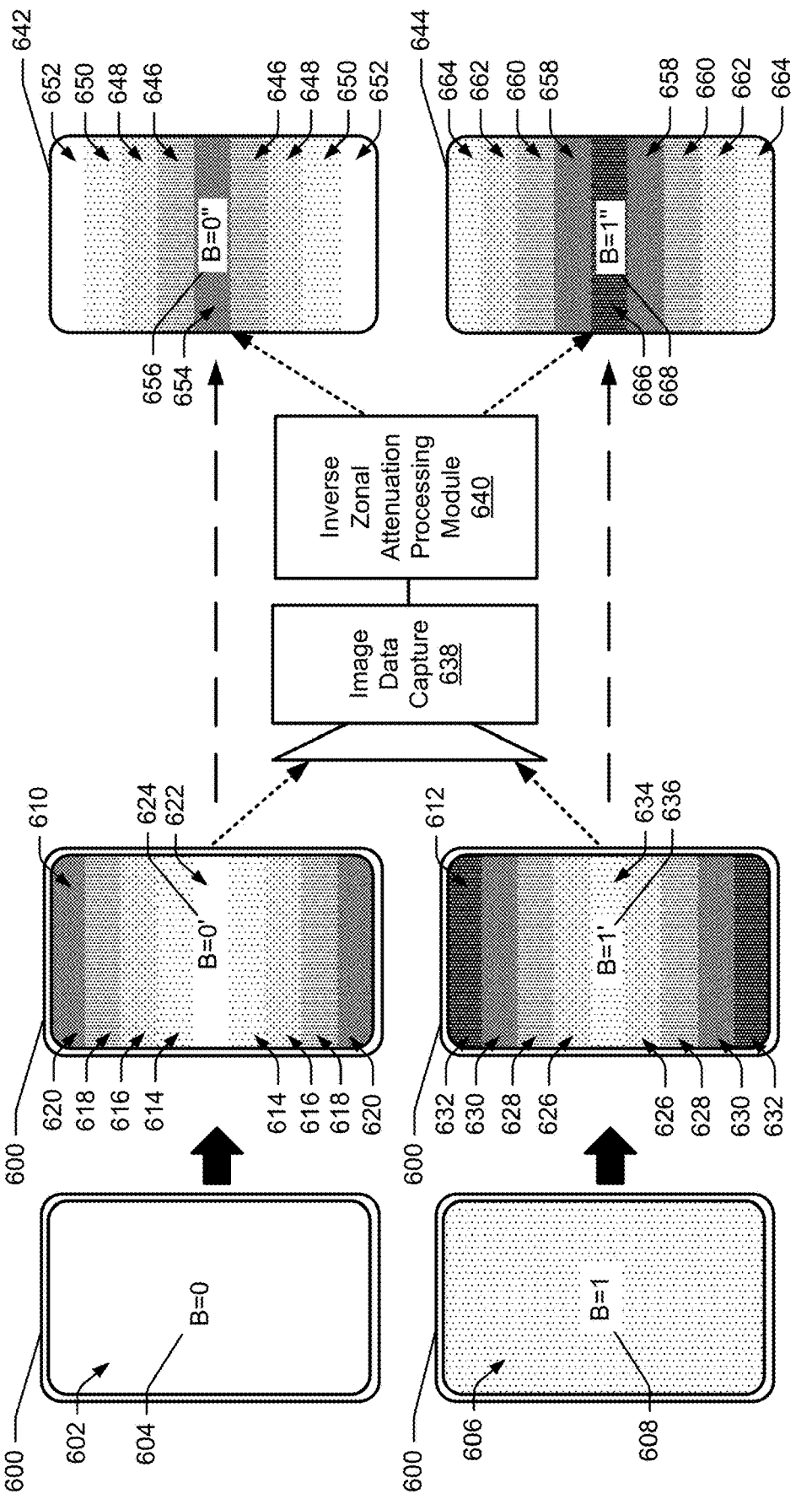
FIG. 6 is a schematic diagram of a generation of inverse zonal attenuation masks based on image data captured from a display panel at different levels of brightness.

Referring to FIG. 6, a display panel 600 for which inverse zonal attenuation masks are to be generated is configured to generate blank images at different brightnesses as sample data for use in generating the inverse zonal attenuation masks. For example, a first blank image 602 is generated at a brightness B=0 604, a second blank image 606 is generated at a brightness B=1 608, etc. A zonal attenuation mask (not shown in FIG. 6) is applied to the blank images 602 and 606 to yield first masked image data 610 and second masked image data 612, respectively. The first masked image data 610 includes regions of reduced brightness 614, 616, 618, and 620 representing a gradient of increasingly reduced brightness at increasing distance from a central region 622 having a brightness B=0' 624. The second masked image data 612 includes regions of reduced brightness 626, 628, 630, and 632 representing a gradient of increasingly reduced brightness at increasing distance from a central region 634 having a brightness B=1' 636. As previously stated, the first and second masked image data 610 and 612 may be a function of the properties of the display panel 600 and the zonal attenuation masks (not shown in FIG. 6) applied.

An image data capture device 638 captures the first and second masked image data 610 and 612. Based on the resulting captured image data, an inverse zonal attenuation processing module 640 generates corresponding inverse zonal attenuation masks 642 and 644 (as described with reference to FIG. 4). The inverse zonal attenuation mask 642 derived from the masked image data 610 includes regions of increased brightness 646, 648, 650, and 652 at increasing distance from a central region 654 having a brightness B=0" 656. The inverse zonal attenuation mask 644 derived from the masked data 624 includes regions of increased brightness 658, 660, 662, and 664 at increasing distance from a central region 666 having a brightness B=1" 668. The inverse zonal attenuation masks 642 and 644 can offset the excessive brightness at one or more regions, including the central regions 622 and 634 of the first and second masked image data 610 and 612, respectively, which may result from panel loading characteristics of the display panel 600 in response to the application of zonal attenuation masks. In aspects, the inverse zonal attenuation masks created for blank images of different brightness levels, such as inverse zonal attenuation masks 642 and 644, are retrieved by an inverse zonal attenuation module in an electronic device when image data and/or masked image data to be displayed is of the same brightness level, as further described below. Retrieval and application of the appropriate inverse zonal mask may help to avoid excessive illumination at a central region of a display that may waste electric power.

Figure 7:
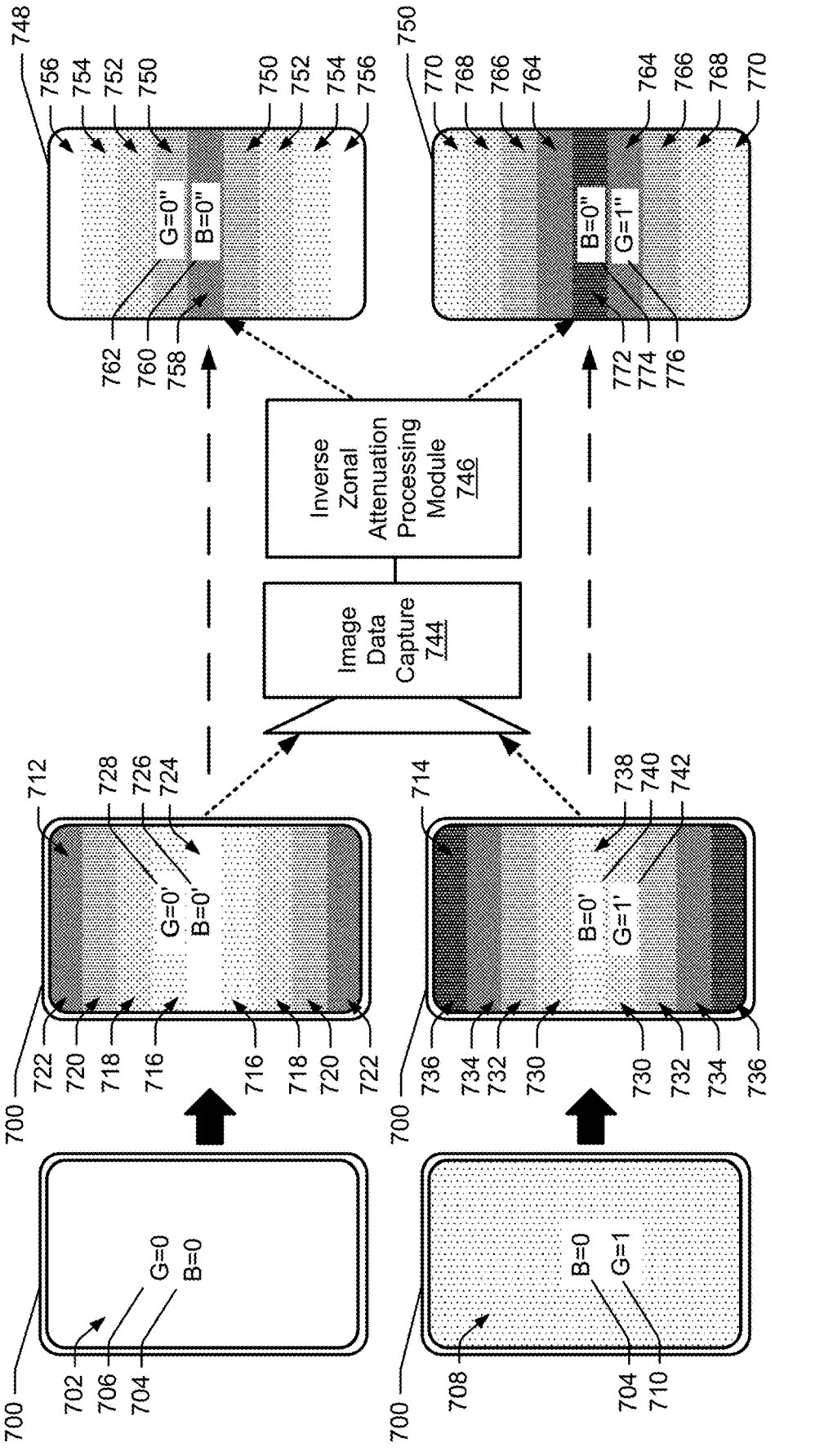
FIG. 7 is a schematic diagram of a generation of inverse zonal attenuation masks based on image data captured from a display panel at different levels of brightness and gray level.

In aspects, to respond to masked image data of different brightness levels and different gray levels, a plurality of inverse zonal attenuation masks may be generated to correspond with masked image data of varying levels of brightness and varying composite gray levels. Referring to FIG. 7, a display panel 700 for which inverse zonal attenuation masks are to be generated are configured to generate blank images at different brightnesses and different gray levels. For example, a first blank image 702 is generated at a brightness B=0 704 and a gray level G=0 706. A second blank image 708 is generated at a same brightness B=0 704 but at a gray level G=1 710. A zonal attenuation mask (not shown in FIG. 7) is applied to the blank images 702 and 708 to yield a first masked image data 712 and a second masked image data 714, respectively. The first masked image data 712 includes regions of reduced brightness 716, 718, 720, and 722 representing a gradient of increasingly reduced brightness at increasing distance from a central region 724 having a brightness B=0' 726 and a gray level of G=0' 728. The second masked image data 714 includes regions of reduced brightness 730, 732, 734, and 736 representing a gradient of increasingly reduced brightness at increasing distance from a central region 738 having a brightness B=0' 740 and a gray level of G=1' 742. As previously stated, the first and second masked image data 712 and 714 may be a function of the properties of the display panel 700 and the zonal attenuation masks (not shown in FIG. 7) applied.

As in the example of FIG. 6, an image data capture device 744 captures the first and second masked image data 712 and 714. Based on the captured image data, an inverse zonal attenuation processing module 746 generates corresponding inverse zonal attenuation masks 748 and 750 as described with reference to FIG. 4. The inverse zonal attenuation mask 748 derived from the masked data 712 includes regions of increased brightness 750, 752, 754, and 756 at increasing distance from a central region 758 having a brightness B=0" 760 and gray level G=0" 762. The inverse zonal attenuation mask 750 derived from the masked data 714 includes regions of increased brightness 764, 766, 768, and 770 at increasing distance from a central region 772 having a brightness B=0" 774 and gray level G=1" 776. The inverse zonal attenuation masks 748 and 750 may offset the excessive brightness in the central regions 724 and 738 of the first and second masked data 712 and 714, respectively, resulting from panel loading characteristics of the display panel 700 in response to the application of zonal attenuation masks. In aspects, the inverse zonal attenuation masks created for blank images of different brightness levels and different gray levels, such as inverse zonal attenuation masks 748 and 750, are retrieved by an inverse zonal attenuation module in an electronic device when image data and/or masked image data to be displayed is of the same brightness level and a same gray level, as further described below. Again, retrieval and application of the appropriate inverse zonal mask may help to avoid excessive illumination at one or more regions, including a central region of a display. Creating and retrieving inverse zonal attenuation masks of corresponding brightness and gray level may more accurately adjust the image data to avoid excessive brightness in the central region 724 or 738 of the masked image data 712 or 714, respectively.

Figure 8:
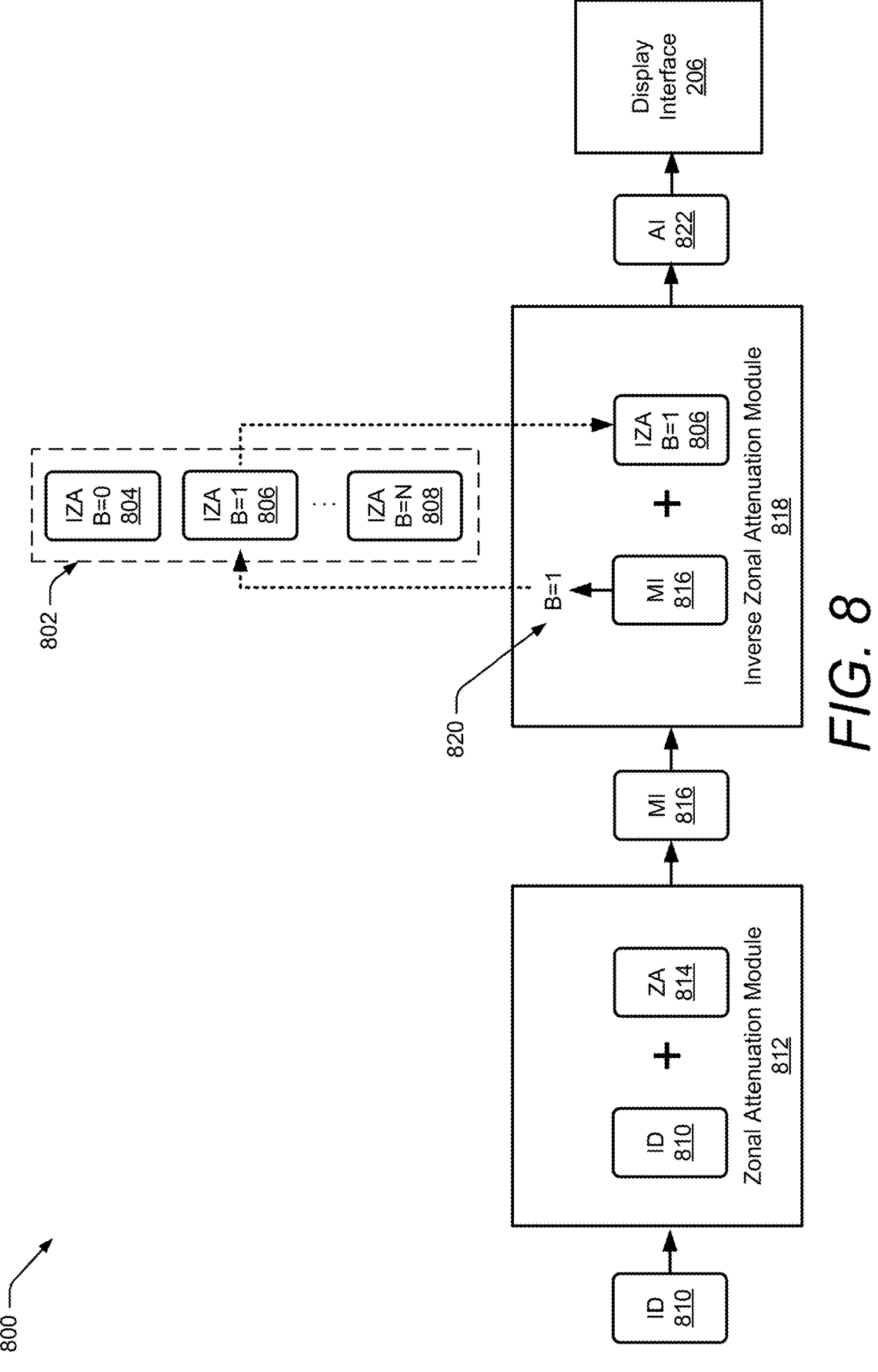
FIG. 8 is a schematic diagram of a display subsystem using an inverse zonal attenuation module to retrieve and apply an inverse zonal attenuation mask based on a brightness level of masked image data.

FIG. 8 illustrates a system 800 in which an inverse zonal attenuation mask (IZA) is retrieved according to brightness from an array of previously-generated inverse zonal attenuation masks 802 for application to masked image data (MI). The array of inverse zonal attenuation masks 802 may be generated as previously described with reference to FIG. 6. A number of inverse zonal attenuation masks may be generated for a number of sets of masked image data according to a brightness level of each of the sets of masked image data. Thus, for example, the array of inverse zonal attenuation masks 802 includes an inverse zonal attenuation mask for a brightness level B=0 (IZA B=0) 804, an inverse zonal attenuation mask for a brightness level B=1 (IZA B=1) 806, through an inverse zonal attenuation mask for a brightness level B=N (IZA B=N) 808.

A process of retrieving and applying the appropriate inverse zonal attenuation masks from the array of previously-generated inverse zonal attenuation masks 802 may begin with a set of image data (ID) 810 being provided to a zonal attenuation module 812. The zonal attenuation module 812 applies a zonal attenuation (ZA) mask 814 to the image data 810, combining the image data 810 with the zonal attenuation mask 814 to generate masked image (MI) data 816. As previously described, the masked image data 816 may include a central region that may be excessively bright and for which a portion of the power saved by the application of the zonal attenuation mask may be wasted. Thus, the masked image data 816 is provided to an inverse zonal attenuation module 818.

In aspects, the inverse zonal attenuation module 818 identifies a brightness of the masked image data 816 which, in this example, is B=1 820. Thus, the inverse zonal attenuation module 818 retrieves the inverse zonal attenuation mask (IZA) for brightness B=1 806. The inverse zonal attenuation mask for B=1 806 is applied to the masked image data 816 to generate adjusted image data 822 (AI 822). As previously described, the application of the inverse zonal attenuation mask 806 may reduce what would be excessively bright regions of the masked image data 816 to prevent power from being wasted by excessively illuminating these regions. The adjusted image data 822 is then provided to the display interface 206 for the adjusted image data 822 to be presented at a display panel (not shown in FIG. 8).

Figure 9:
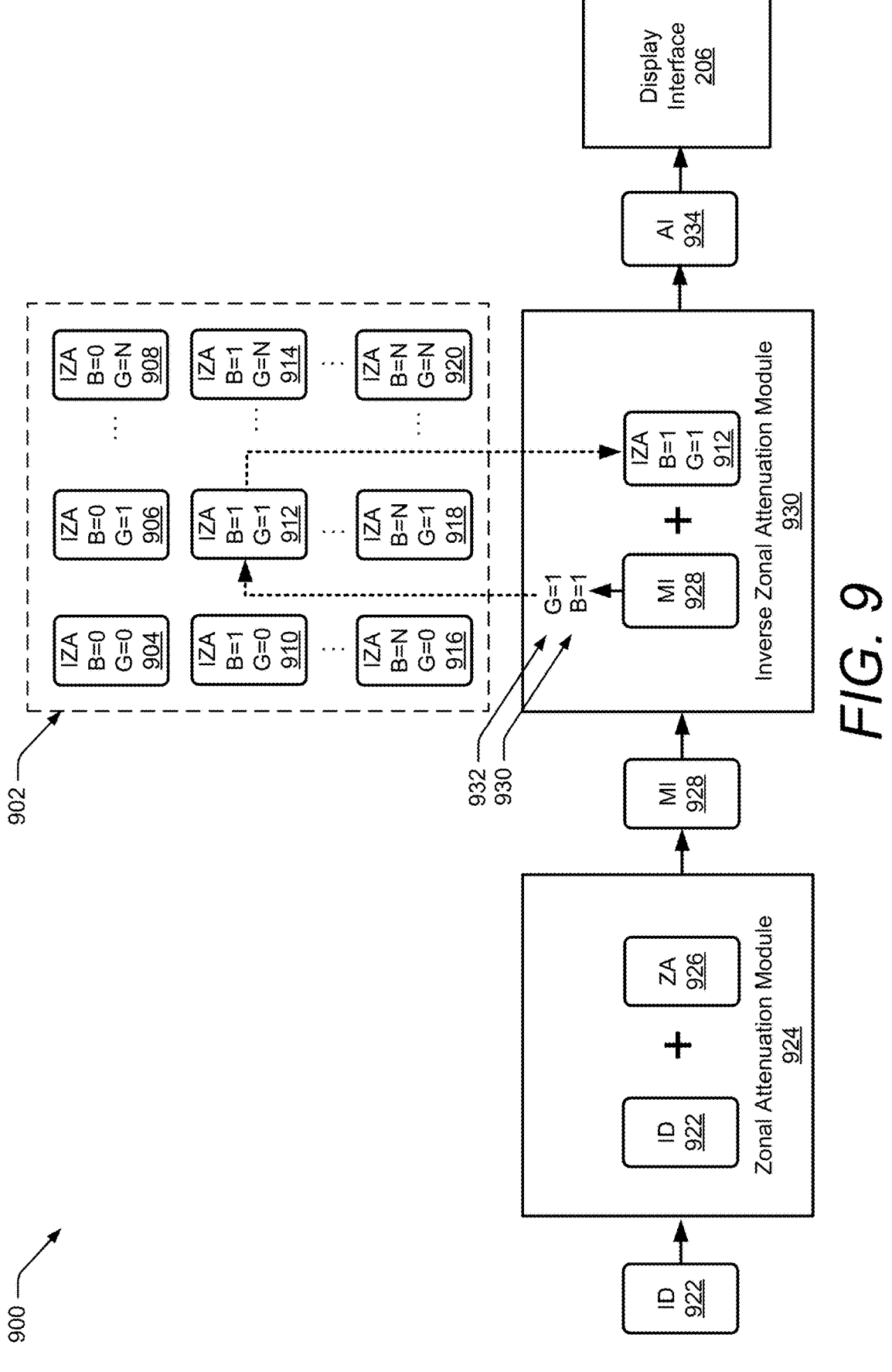
FIG. 9 is a schematic diagram of a display subsystem using an inverse zonal attenuation module to retrieve and apply an inverse zonal attenuation mask based on a brightness level and a gray level of masked image data.

FIG. 9 illustrates a system 900 that uses a similar process for retrieving and applying previously-generated inverse zonal attenuation masks that are generated for masked image data of a particular brightness and a particular gray level. An array of inverse zonal attenuation masks 902 may be generated as previously described with reference to FIG. 7, where a number of inverse zonal attenuation masks are generated for a plurality of sets of masked image data according to a brightness level and a gray level of each of the sets of masked image data. For example, the array of inverse zonal attenuation masks 902 includes a number of inverse zonal attenuation masks for a brightness level B=0 and various gray levels including inverse zonal attenuation masks for a brightness level B=0 and a gray level G=0 (IZA B=0 G=0) 904, for a brightness level B=0 and a gray level G=1 (IZA B=0 G=1) 906, through a brightness level B=0 and a gray level G=N (IZA B=0 G=N) 908. The array of inverse zonal attenuation masks 902 also includes a number of inverse zonal attenuation masks for a brightness level B=1 and various gray levels including inverse zonal attenuation masks for a brightness level B=1 and a gray level G=0 (IZA B=1 G=0) 910, for a brightness level B=1 and a gray level G=1 (IZA B=1 G=1) 912, through a brightness level B=1 and a gray level G=N (IZA B=1 G=N) 914. The array of inverse zonal attenuation masks 902 includes additional inverse zonal attenuation masks through a brightness level B=N and various gray levels including inverse zonal attenuation masks for a brightness level B=N and a gray level G=0 (IZA B=N G=0) 916, for a brightness level B=N and a gray level G=1 (IZA B=N G=1) 918, through a brightness level B=N and a gray level G=N (IZA B=N G=N) 920.

A process of retrieving and applying the appropriate inverse zonal attenuation masks from the array of previously-generated inverse zonal attenuation masks 902 is similar to the process described with reference to FIG. 8 except that, in the example of FIG. 9, inverse zonal attenuation masks are retrieved according to a brightness level and a gray level, rather than just by brightness level. A process begins with a set of image data (ID) 922 being presented to a zonal attenuation module 924. The zonal attenuation module 924 applies a zonal attenuation (ZA) mask 926 to the image data 922, combining the image data 922 with the zonal attenuation mask 926 to generate masked image (MI) data 928. As previously described, the masked image data 816 may include a central region that may be excessively bright and for which a portion of the power saved by the application of the zonal attenuation mask may be wasted. Thus, the masked image data 928 is presented to an inverse zonal attenuation module 930.

In aspects, the inverse zonal attenuation module 930 identifies a brightness of the masked image data 928 which, in this example, is B=1 930. In the system 900 of FIG. 9, the inverse zonal attenuation module 930 also identifies a gray level of the masked image data 928 which, in this example, is G=1 932. Thus, the inverse zonal attenuation module 930 retrieves the inverse zonal attenuation mask (IZA) for brightness B=1 G=1 912. The inverse zonal attenuation mask for B=1 G=1 912 is applied to the masked image data 928 to generate adjusted image data 934 (AI 934). As previously described, the application of the inverse zonal attenuation mask 806 reduces what may be excessively bright regions of the masked image data 928 to prevent power from being wasted by excessively illuminating these regions. The adjusted image data 934 is then provided to the display interface 206 for the adjusted image data 934 to be presented at a display panel (not shown in FIG. 9).

Figure 10:
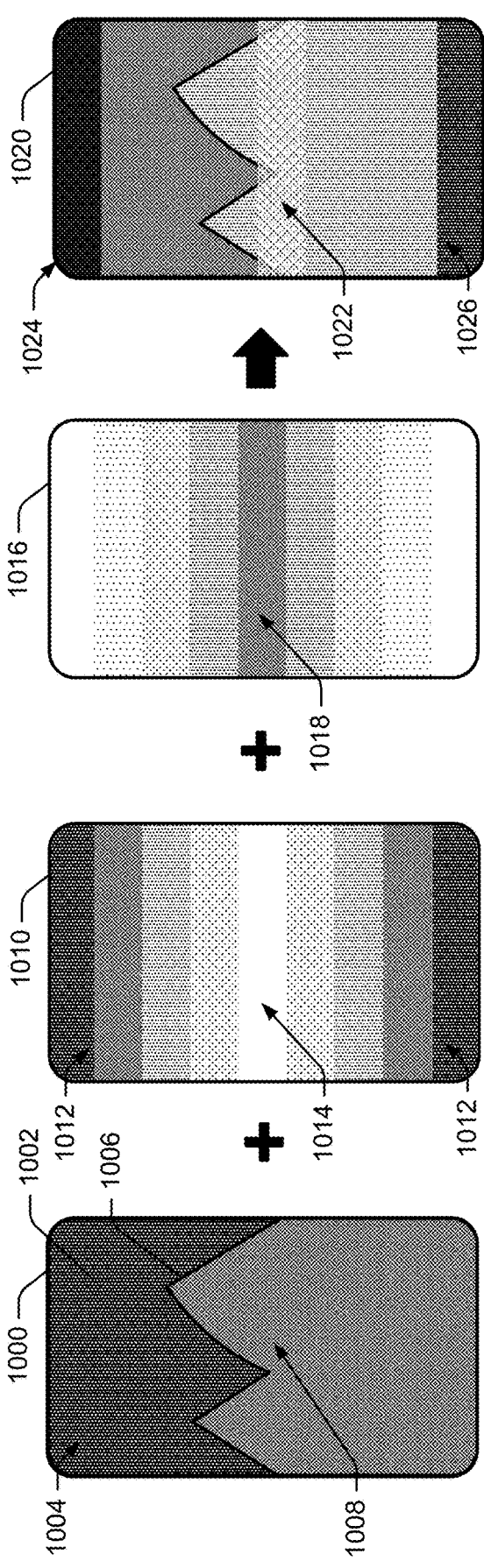
FIG. 10 is a schematic diagram of image data for which content-adaptive inverse zonal attenuation may be appropriate.

The foregoing examples of FIGS. 2-9 describe systems and methods in which the inverse zonal attenuation masks apply regional loading compensation relative to a position on a display panel in which the image data may be presented. However, in other aspects, an inverse zonal attenuation mask may employ content-adaptive compensation to adjust a brightness of the image data based on the brightness and/or gray level of actual content of the image data. Referring to FIG. 10, image data 1000 may include a relatively dark area 1002 toward one end region 1004 of the image data 1000 and a brighter object 1006 in a central region 1008 of the image data 1000. A zonal attenuation mask 1010 that includes end regions with reduced brightness 1012 and a central area with increased brightness 1014 may be combined with the image data 1000. A regional-loading based inverse zonal attenuation mask 1016 that includes a central region with reduced brightness 1018 is combined with the image data 1000 and the zonal attenuation mask 1010 to generate adjusted image data 1020. As a result, portions of the brighter object 1006 in the central region 1022 of the adjusted image data 1020 may not be reduced in brightness sufficiently, while the relatively dark area 1002 toward an end region 1004 of the image data 1000 may be reduced in brightness even more than may be desired at an end region 1024 of the adjusted image data 1020.

Figure 11:
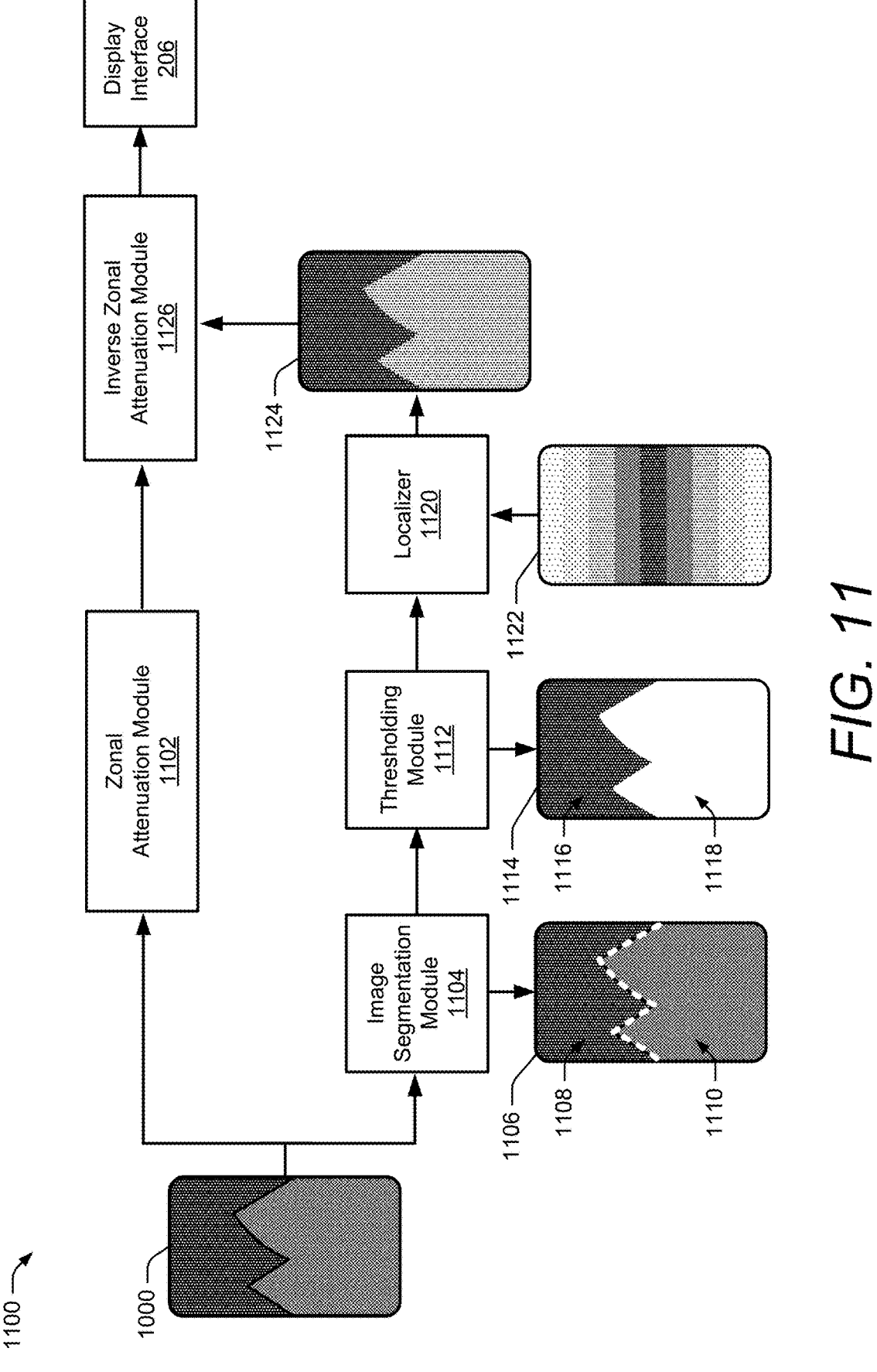
FIG. 11 is a schematic diagram of a process of using content-adaptive inverse zonal attenuation.

In a system 1100 of FIG. 11, localized application of inverse zonal attenuation may be used to avoid excessive illumination or excessive dimming in portions of the image data 1000 (FIG. 10). The image data 1000 may be provided to a zonal attenuation module 1102, as previously described. In aspects, the image data 1000 may be provided to an image segmentation module 1104. Using, for example, a machine-learned technique, the image segmentation module 1104 generates segmented image data 1106. For example, the image segmentation module 1104 may segment regions of the image data 1000 into one or more dark regions 1108 and one or more light regions 1110. The segmented image data 1106 may be provided to a thresholding module 1112 that compares brightness of the regions 1108 and 1110 to a predetermined threshold. In aspects, in one or more regions of the segmented image data 1106 in which the brightness is less than the predetermined threshold, no inverse zonal attenuation is applied, while, in one or more regions of the segmented image data 1106 in which the brightness meets or exceeds the predetermined threshold, inverse zonal attenuation is applied to avoid excessive illumination of a portion of the segmented image data 1106. Thus, for example, within thresholded data 1114 generated by the thresholding module 1112, in a dark region 1116 having a brightness below the predetermined threshold, no inverse zonal attenuation is applied while, in a light region 1118 having a brightness equal to or greater than the predetermined threshold, inverse zonal attenuation is applied.

The thresholded data 1114 can be provided to a localizer 1120 that selectively applies a regional-loading based inverse zonal attenuation mask 1122 to portions of the thresholded data 1114. For example, the inverse zonal attenuation mask 1122 may be applied to the region 1118 meeting the predetermined threshold to prevent excessive illumination of the light region 1118 of the thresholded data 1114. At the same time, inverse zonal attenuation is not applied to the dark region 1116 of thresholded data 1114 because the dark region 1116 requires no further adjustment to prevent excessive illumination. A resulting content-adaptive inverse zonal attenuation mask 1124 is presented to an inverse zonal attenuation module 1126 to be combined with the masked image data generated by the zonal attenuation module 1102 and then presented to the display interface 206 for presentation at a display panel (not shown).

Example Systems Employing Inverse Zonal Attenuation

Figure 12:
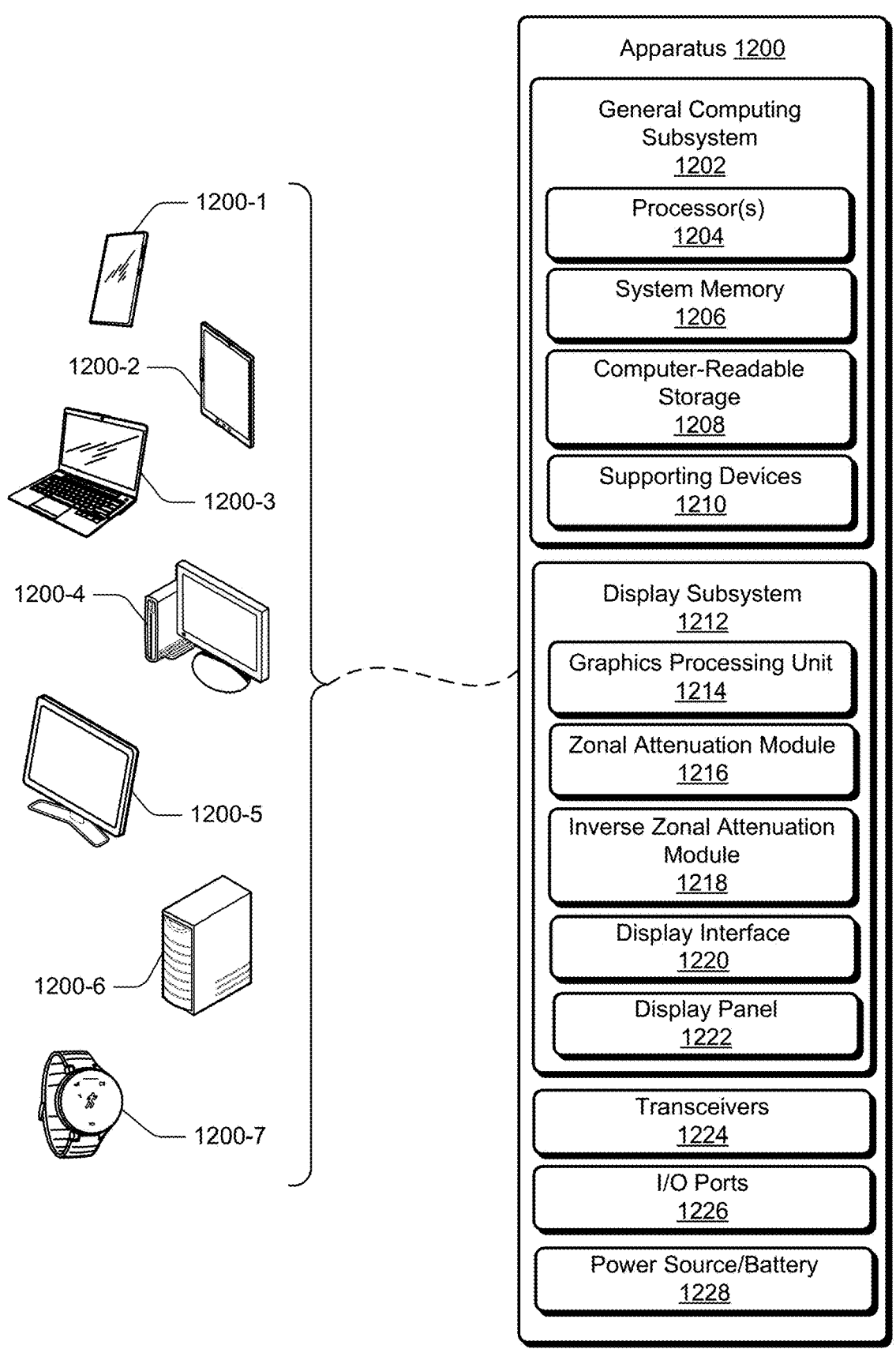
FIG. 12 is a block diagram of one or more apparatuses including an inverse zonal attenuation module.

Referring to FIG. 12, an apparatus 1200 may include subsystems to use inverse zonal attenuation to avoid excessively illuminating portions of a display panel and, thus, wasting battery power or other electrical power. The apparatus 1200 may be implemented as any suitable device, some of which are illustrated as a smart-phone 1200-1, a tablet computer 1200-2, a laptop computer 1200-3, a gaming console 1200-4, a desktop computer 1200-5, a server computer 1200-6, and a wearable computing device 1200-7 (e.g., smart-watch). Although not shown, the system 1100 may also be implemented in any device that includes a display panel, such as a mobile communication device, a client device, user equipment, an entertainment device, a mobile gaming console, a personal media device, a media playback device, a health monitoring device, a drone, a camera, an Internet home appliance capable of wireless Internet access and browsing, an Internet-of-Things (IoT) device, and/or other types of electronic devices. The apparatus 1200 may provide other functions or include components or interfaces omitted from FIG. 12 for the sake of clarity or visual brevity.

The apparatus 1200 includes general computing subsystem 1202 including one or more processors 1204, a system memory 1206 (including random access memory, read only memory, and other memory devices), computer-readable storage 1208, and supporting devices 1210 that interconnect the elements of the general computing subsystem 1202 and that provide communications with other elements of the apparatus 1200. A display subsystem 1212 includes a graphics processing unit 1214 to generate image data. As described herein, the display subsystem 1212 also may include a zonal attenuation module 1216, an inverse zonal attenuation module 1218, a display interface 1220 and a display panel 1222. The apparatus 1200 also includes other elements, such as one or more transceivers 1224 to provide wired or wireless communications and input/output (I/O) ports 1226 through which wired transceivers may communicate with the apparatus 1200. The apparatus 1200 also includes a power source and/or battery 1228. As previously described, it is an object of the inverse zonal attenuation module 1216 to prevent unnecessary consumption of electric power provided by the power source or battery 1128 that may be wasted in excessively illuminating portions of masked image data generated by the zonal attenuation module 1216.

Example Methods of Inverse Zonal Attenuation

FIG. 13 illustrates an example method 1300 of zonal attenuation compensation through the use of inverse zonal attenuation, as previously described with reference to FIGS. 1-11. The method 1300 is shown as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example operating environments of FIGS. 1 through 12 or to entities or processes as detailed in other figures, reference to which is made for example only. The techniques are not limited to performance by one entity or multiple entities operating on one device.

At a block 1302, masked image data is received, the masked image data including image data combined with a zonal attenuation mask resulting in a reduced brightness for portions of data corresponding to one or more regions of a display panel based on the zonal attenuation mask. At a block 1304, a brightness is determined for additional portions of data corresponding to one or more additional regions of the display panel, the brightness including an increased brightness in the one or more additional regions of the display panel resulting from the zonal attenuation mask diverting electric current from the one or more regions to the one or more additional regions. At a block 1306, an inverse zonal attenuation mask is selected, the zonal attenuation mask being configured to at least partially reduce the increased brightness in the one or more additional regions of the display panel. At a block 1308, the inverse zonal attenuation mask is combined with the masked image data to generate adjusted image data.

This document describes apparatuses, systems, and techniques for performing zonal attenuation compensation through the use of inverse zonal attenuation. The use of inverse zonal attenuation may help to avoid the waste of electric power diverted to a central region of a display as a result of the application of a zonal attenuation mask causing regions of reduced brightness at end regions of a display.

CONCLUSION

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

Although implementations of systems and techniques zonal attenuation compensation have been described in language specific to certain features and/or methods, the subject of the appended claims is not necessarily limited to the specific features or methods described. Rather, the specific features and methods are disclosed as example implementations of systems and techniques for zonal attenuation compensation.

What is claimed is:

1. A system comprising:

a graphics processing unit configured to provide image data to a display panel;

a zonal attenuation module configured to combine a zonal attenuation mask with the image data to generate masked image data, the masked image data having a reduced brightness for portions of data corresponding to one or more regions on the display panel; and an inverse zonal attenuation module configured to apply an inverse zonal attenuation mask to the masked image data to reduce a brightness for additional portions of data corresponding to one or more additional regions on the display panel effective to offset a potential increased brightness in the one or more additional regions on the display panel, the reduction of brightness effective to offset the potential increased brightness resulting from the zonal attenuation mask diverting electric current from the one or more regions to the one or more additional regions.

2. The system of claim 1, wherein attributes of the inverse zonal attenuation mask are based on at least one of a detected brightness value and a detected gray level of the masked image data.

3. The system of claim 1, wherein the zonal attenuation module is configured to select the inverse zonal attenuation mask from a plurality of previously-generated inverse zonal attenuation masks, each of the plurality of inverse zonal attenuation masks being generated for at least one of a specified brightness value and a specified gray level in ranges that may be detectable in the masked image data.

4. The system of claim 3, wherein the plurality of previously-generated inverse zonal attenuation masks are generated based on blank images presented on a sample display panel for at least one of a plurality of brightness values and a plurality of gray levels.

5. The system of claim 1, wherein the inverse zonal attenuation module is configured to generate the inverse zonal attenuation mask based on actual loading of the display panel based on content of the image data.

6. The system of claim 5, wherein the inverse zonal attenuation mask is generated based on:

segmenting the masked image data into one or more segments based on at least one of brightness and gray levels within the segments; and selectively applying the inverse zonal attenuation mask based on a brightness of the one or more segments.

7. The system of claim 6, wherein the inverse zonal attenuation module is configured to selectively apply the inverse zonal attenuation mask to any of the one or more additional regions having a brightness level that exceeds a brightness threshold value.

8. The system of claim 1, wherein:

the display panel includes an organic light emitting diode (OLED) display panel;

the one or more regions on the display panel comprise opposing end regions of the OLED display;

the one or more additional regions comprise a central region of the OLED display panel; and the OLED display panel is characterized by nonlinear loading that generates an increased brightness at the central region as a result of the brightness being reduced at the opposing end regions of the OLED display panel from an application of the zonal attenuation mask.

9. A computing device comprising:

a display panel; and a display subsystem including:

a graphics processing unit configured to provide image data to a display panel;

a zonal attenuation module configured to combine a zonal attenuation mask with the image data to generate masked image data, the masked image data having a reduced brightness for portions of data corresponding to one or more regions on the display panel based on the zonal attenuation mask; and an inverse zonal attenuation module configured to apply an inverse zonal attenuation mask to the masked image data to reduce a brightness for additional portions of data corresponding to one or more additional regions on the display panel effective to offset a potential increased brightness in the one or more additional regions on the display panel, the reduction of brightness effective to offset the potential increased brightness resulting from the zonal attenuation mask diverting electric current from the one or more regions to the one or more additional regions.

10. The computing device of claim 9, wherein attributes of the inverse zonal attenuation mask are based on at least one of a detected brightness value and a detected gray level of the masked image data.

11. The computing device of claim 9, wherein the zonal attenuation module is configured to select the inverse zonal attenuation mask from a plurality of previously-generated inverse zonal attenuation masks, each of the plurality of inverse zonal attenuation masks being generated for at least one of a specified brightness value and a specified gray level in ranges that may be detectable in the masked image data.

12. The computing device of claim 11, wherein the plurality of previously-generated inverse zonal attenuation masks are generated based on blank images presented on a sample display panel for at least one of a plurality of brightness values and a plurality of gray levels.

13. The computing device of claim 9, wherein the inverse zonal attenuation module is configured to generate the inverse zonal attenuation mask based on actual loading of the display panel based on content of the image data.

14. The computing device of claim 13, wherein the inverse zonal attenuation mask is generated based on:

segmenting the image data into one or more segments based on at least one of brightness and gray levels within the segments; and selectively applying the inverse zonal attenuation mask based on brightness of the one or more segments.

15. The computing device of claim 14, wherein the inverse zonal attenuation module is configured to selectively apply the inverse zonal attenuation mask to any of the one or more segments having a brightness level that exceeds a brightness threshold value.

16

16. A method comprising:

receiving masked image data, the masked image data including image data combined with a zonal attenuation mask resulting in a reduced brightness for portions of data corresponding to one or more regions of a display panel based on the zonal attenuation mask;

determining a brightness of additional portions of data corresponding to one or more additional regions of the display panel, the brightness including an increased brightness in the one or more additional regions of the display panel resulting from the zonal attenuation mask diverting electric current from the one or more regions to the one or more additional regions;

selecting an inverse zonal attenuation mask configured to at least partially reduce the increased brightness in the one or more additional regions of the display panel; and combining the inverse zonal attenuation mask with the masked image data to generate adjusted image data.

17. The method of claim 16, further comprising configuring the inverse zonal attenuation mask to at least partially reduce the increased brightness based on at least one of a brightness and a gray level of the masked image data.

18. The method of claim 16, further comprising:

generating a plurality of inverse zonal attenuation masks, each of the zonal attenuation masks corresponding to at least one of brightness value and a gray level of sample image data; and in response to receiving the masked image data, retrieving one of the plurality of inverse zonal attenuation masks previously generated based on at least one of a brightness and a gray level of the masked image data.

19. The method of claim 16, further comprising:

segmenting the masked image data into one or more segments based on at least one of brightness and gray levels within the segments; and selectively applying the inverse zonal attenuation mask based on brightness of the one or more segments.

20. The method of claim 19, further comprising selectively applying the inverse zonal attenuation mask to one or more segments of the masked image data depending on whether a brightness level of the one or more segments exceeds a threshold value.

* * * * *